US008859938B2

(12) United States Patent
Eisenhour et al.

(10) Patent No.: US 8,859,938 B2
(45) Date of Patent: Oct. 14, 2014

(54) VEHICLE CABIN HEATING SYSTEM

(75) Inventors: Ronald S Eisenhour, West Bloomfield, MI (US); Alaa Meram, Sterling Hts., MI (US)

(73) Assignee: Nissan North America, Inc., Franklin, TN (US)

( * ) Notice: Subject to any disclaimer, the term of this patent is extended or adjusted under 35 U.S.C. 154(b) by 723 days.

(21) Appl. No.: 12/359,804

(22) Filed: Jan. 26, 2009

(65) Prior Publication Data
US 2010/0187211 A1   Jul. 29, 2010

(51) Int. Cl.
*B60L 1/02*   (2006.01)
*F27D 11/00*   (2006.01)
*B60H 1/00*   (2006.01)
*B60H 1/22*   (2006.01)

(52) U.S. Cl.
CPC .......... *B60H 1/00* (2013.01); *B60H 2001/2265* (2013.01); *B60H 1/00742* (2013.01); *B60H 2001/224* (2013.01); *B60H 1/2225* (2013.01); *B60H 2001/2293* (2013.01); *Y02T 10/88* (2013.01)
USPC .......................................... 219/202; 219/385

(58) Field of Classification Search
USPC ......... 219/202, 385, 409, 411, 483, 490, 509, 219/511, 552, 533; 392/420
See application file for complete search history.

(56) References Cited

U.S. PATENT DOCUMENTS

| | | | |
|---|---|---|---|
| 1,852,599 A | 4/1932 | Zaiger et al. | |
| 1,917,141 A | 7/1933 | Middleton | |
| 2,414,520 A | 1/1947 | Greenwald | |
| 2,681,409 A | 6/1954 | Dobbins | |
| 3,619,555 A | 11/1971 | Bassett, Jr. | |
| 5,063,688 A * | 11/1991 | Moll et al. | 34/97 |
| 5,725,052 A * | 3/1998 | Kawai et al. | 165/203 |
| 7,003,217 B2 | 2/2006 | Bachinski et al. | |
| 7,205,505 B2 * | 4/2007 | Diemer et al. | 219/217 |
| 7,248,790 B2 * | 7/2007 | Misumi et al. | 392/420 |
| 2002/0094197 A1 * | 7/2002 | Grob et al. | 392/407 |
| 2008/0105219 A1 * | 5/2008 | Corley | 123/3 |
| 2008/0256967 A1 * | 10/2008 | Errington | 62/244 |

FOREIGN PATENT DOCUMENTS

| | | | |
|---|---|---|---|
| JP | 2006-193067 A | | 7/2006 |
| JP | WO2008155893 | * | 6/2008 |
| JP | 2008-249243 A | | 10/2008 |
| JP | 2008-254489 | * | 10/2008 |
| JP | 2008254489 | * | 10/2008 |
| KR | 835226 B1 | * | 6/2008 |
| WO | WO 2008155893 | * | 12/2008 |

OTHER PUBLICATIONS

Machine Translation for JP 2008254489, Date Oct. 2011.*
Machine Translation of WO2008155893, Date Oct. 2011.*
Machine Translation of KR 835226, Date Oct. 2011.*

* cited by examiner

*Primary Examiner* — Dana Ross
*Assistant Examiner* — Thomas Ward
(74) *Attorney, Agent, or Firm* — Global IP Counselors, LLP

(57) ABSTRACT

A vehicle cabin heating system is provided basically with an infrared heater, a temperature sensor and a controller. The infrared heater is aimed to heat a target surface in front of the infrared heater within a vehicle cabin interior space. The temperature sensor is disposed in front of the first infrared heater to detect a measured temperature in front of the first infrared heater. The controller is operatively coupled to the first infrared heater to selectively operate the first infrared heater to a target surface temperature within the vehicle cabin interior space whenever an estimated surface temperature of a target surface is determined based on the measured temperature by the temperature sensor falls below a prescribed temperature range below the target surface temperature.

36 Claims, 4 Drawing Sheets

US 8,859,938 B2

VEHICLE CABIN HEATING SYSTEM

BACKGROUND OF THE INVENTION

1. Field of the Invention

The present invention generally relates to a vehicle cabin heating system. More specifically, the present invention relates to supplying heating a vehicle cabin interior space using at least one infrared heater.

2. Background Information

For many years, automotive vehicles have been provided with climate control systems (e.g., heating, ventilating and air conditioning (HVAC) systems) in order to provide a more comfortable environment for the driver and any passengers. Typically, fresh air is supplied to the HVAC system via a ductwork extending from a cowl box of the vehicle to cabin outlets in the vehicle cabin interior space. The conventional approach to heat the vehicle cabin is to utilize waste heat from the power-train system by powering a blower motor and delivering air through a heat exchanger that uses circulating engine coolant. In particular, in such a conventional engine coolant based heating system, a heater core (heat exchanger) is disposed in the ductwork between the cowl box and the cabin outlets, and a blower is provided in the ductwork to deliver the heated air to the cabin. The heater core is normally heated by the engine coolant from the vehicle's engine. In cold conditions, when the vehicle is first started, the engine is cold. In other words, there may not be significant temperature potential available to quickly warm the cabin with this conventional engine coolant based heating system, the occupants must wait to be comfortable. Thus, the engine coolant is also cold and is insufficient to warm the air entering the vehicle cabin. This results in a period of time in which the cabin remains below the desired cabin temperature. In order to solve this problem, an infrared heater has been proposed in U.S. Pat. No. 3,619,555 to Bassett, Jr. (assigned to General Motors Corporation), in which heater is designed to be energized only when the vehicle engine coolant is below a predetermined temperature and the ignition switch is "on".

In recent years, hybrid vehicles and electric vehicles have become more popular. A hybrid vehicle includes an internal combustion engine and an electric motor or a battery as power sources for providing a driving force to a vehicle drive train. In the case of hybrid vehicles, the internal combustion engine is stopped, when travelling in an electric (EV) mode. When the hybrid vehicle is travelling in an electric (EV) mode, the engine coolant will typically stop being circulated through the heater core (heat exchanger) that is disposed in the HVAC ductwork. Thus, the engine coolant temperature will drop while the vehicle is travelling in an electric (EV) mode. In the above mentioned patent, the infrared heater operates when the engine coolant temperature drops below a predetermined temperature. Apparently, the infrared heater will continue to operate until the engine coolant temperature above the predetermined temperature of the coolant. Thus, the proposed heating system of the above mentioned patent is not well suited for hybrid vehicles. Likewise, the proposed heating system of the above mentioned patent is not well suited for electric vehicles. Electric vehicles often have a cooling system for the batteries and/or the motor that somewhat resembles that of an internal combustion engine configuration. However, the waste heat generation is very low compared to an internal combustion engine and as a consequence has a reduced capability to heat the cabin.

In view of the above, it will be apparent to those skilled in the art from this disclosure that there exists a need for an improved vehicle cabin heating system. This invention addresses this need in the art as well as other needs, which will become apparent to those skilled in the art from this disclosure.

SUMMARY OF THE INVENTION

In view of the state of the known technology, one object of the present invention is to vehicle cabin heating system that is well suited for a variety of vehicles, including hybrid vehicles and electric vehicles.

In accordance with one aspect of the present invention, a vehicle cabin heating system is provided that basically comprises a first infrared heater, a temperature sensor and a controller. The first infrared heater is aimed to heat a target surface in front of the first infrared heater within a vehicle cabin interior space. The temperature sensor is disposed in front of the first infrared heater to detect a measured temperature in front of the first infrared heater. The controller is operatively coupled to the first infrared heater to selectively operate the first infrared heater to a target surface temperature within the vehicle cabin interior space whenever an estimated surface temperature of a target surface is determined based on the measured temperature by the temperature sensor falls below a prescribed temperature range below the target surface temperature.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
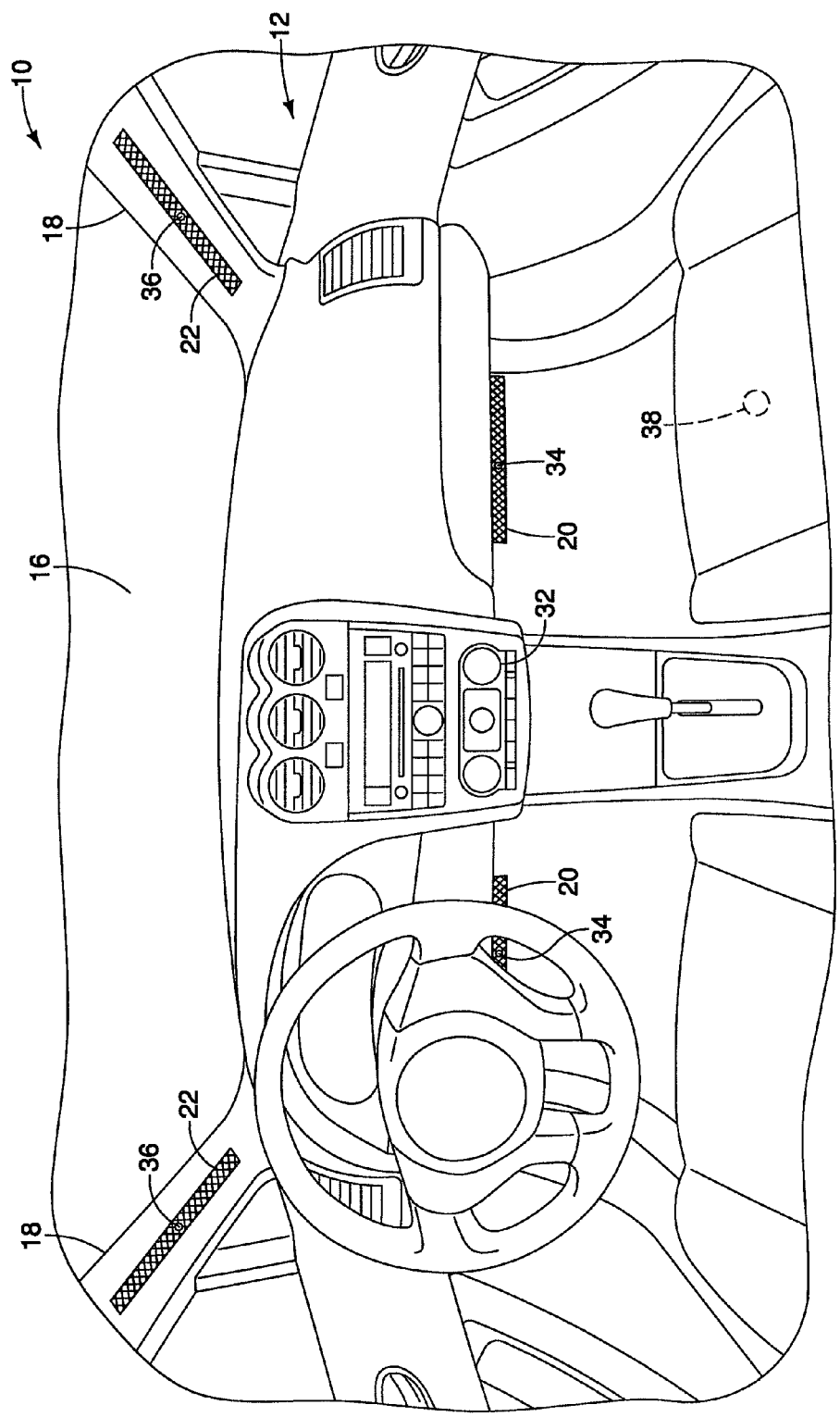
FIG. 1 is a partial perspective view of a vehicle cabin interior space of a vehicle equipped with a vehicle cabin heating system in accordance with one embodiment.

Referring initially to FIG. 1, a hybrid vehicle 10 is illustrated with a vehicle cabin interior space 12 equipped with a vehicle cabin heating system in accordance with one embodiment. The hybrid vehicle 10 is selectively operable in both an electric mode in which only an electric motor of the hybrid vehicle 10 is operated, and a hybrid mode in which both an internal combustion engine of the hybrid vehicle 10 is operated by itself or in conjunction with the electric motor. The operations of the electric motor and the internal combustion engine are well known and thus, we not be discussed herein. Of course, it will be apparent to those skilled in the art from this disclosure that the vehicle cabin heating system illustrated herein can also be adapted to electric vehicles and conventional internal combustion engine vehicles as needed and/or desired.

In the case of the hybrid vehicle 10, the front portion of the vehicle cabin interior space 12 is at least partially defined by a dashboard 14 and a windshield 16, which is supported by a pair of A-pillars 18. The vehicle cabin heating system will typically be primarily installed behind the dashboard 14. Basically, in illustrated embodiment, the vehicle cabin heating system includes a pair of lower infrared heaters 20 and a pair of upper infrared heaters 22 that form a first heating system for complementing a second heating system that is preferably a conventional coolant based heating system.

Figure 2:
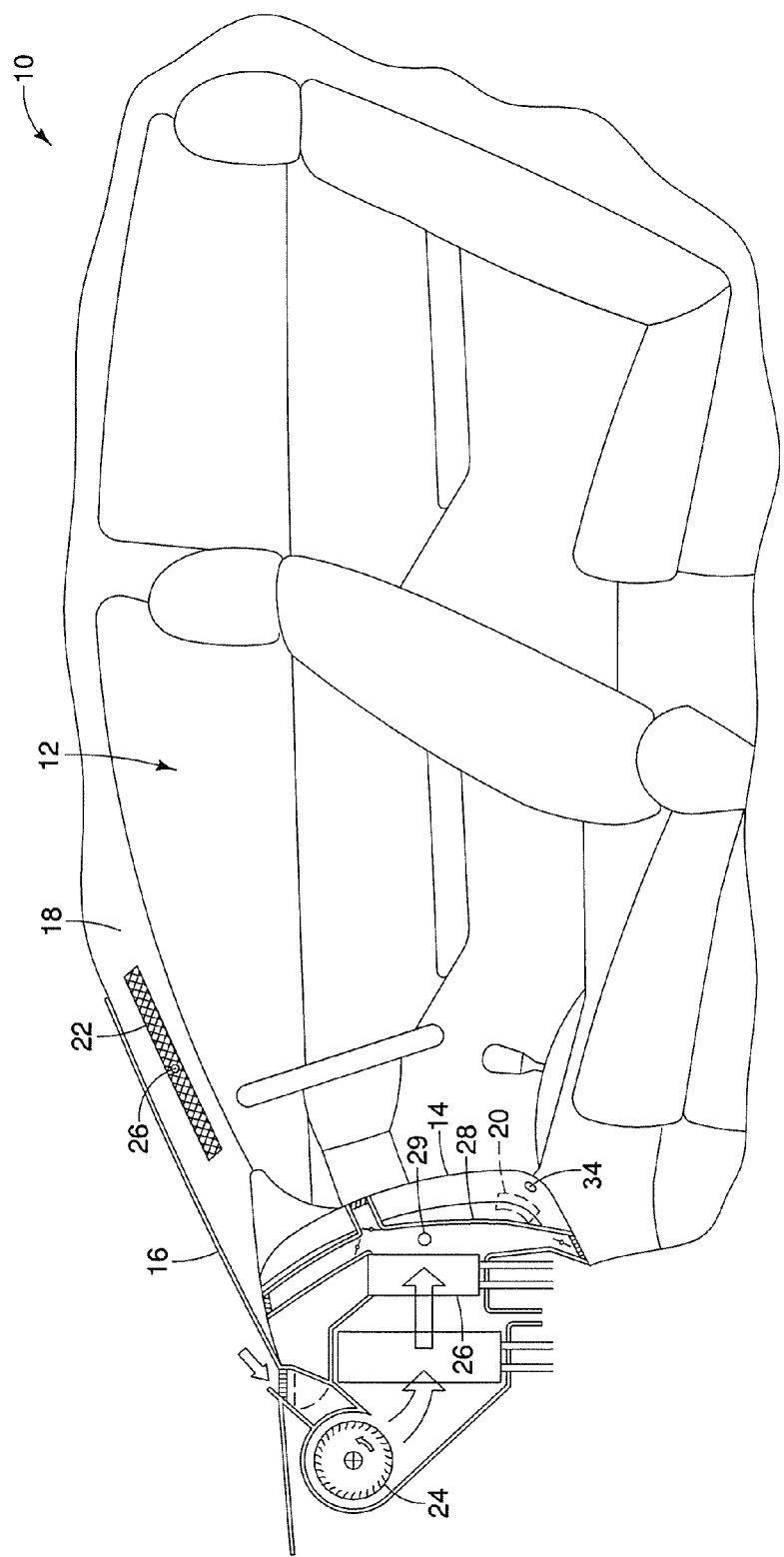
FIG. 2 is a side elevational view of the vehicle cabin interior space of the vehicle illustrated in FIG. 1 with the vehicle cabin heating system.
Figure 3:
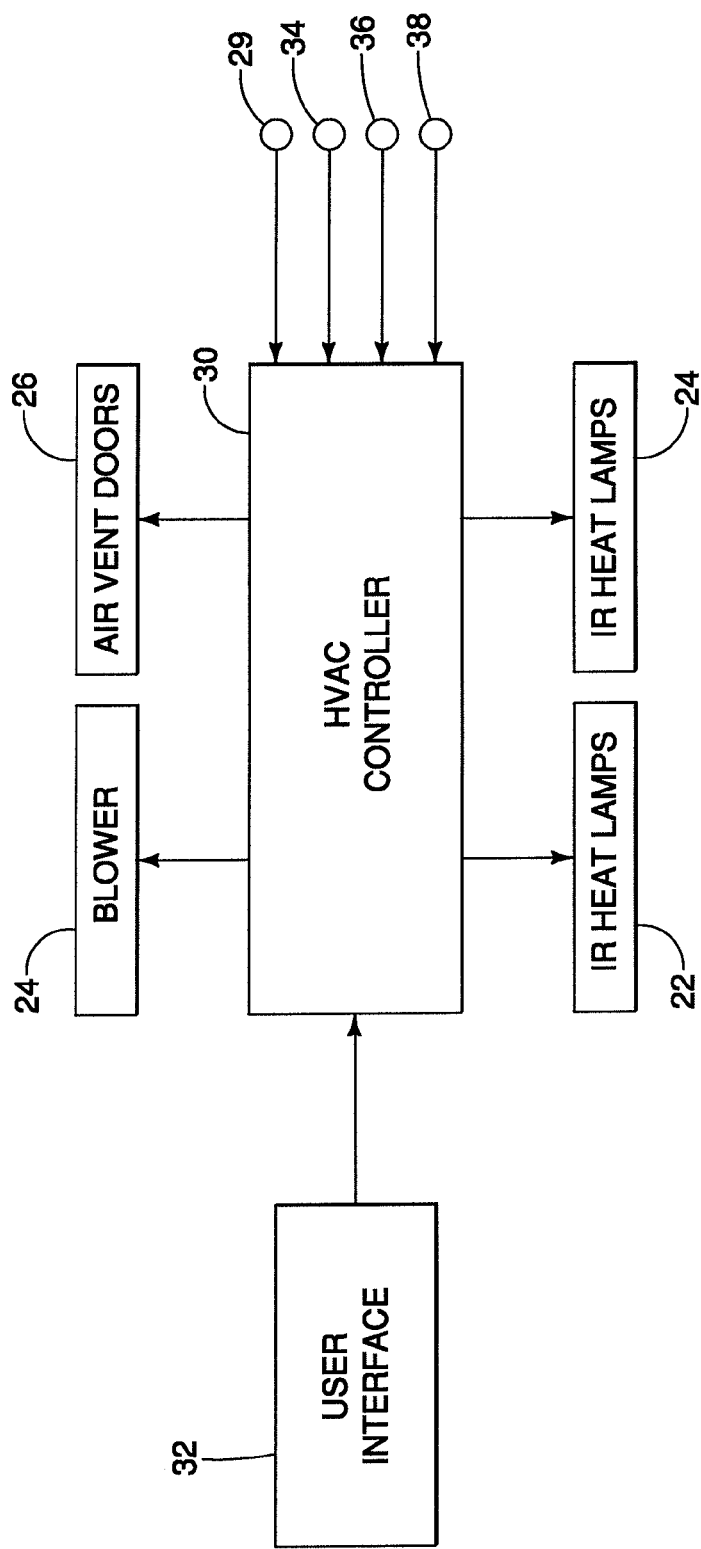
FIG. 3 is a simplified block diagram of the vehicle cabin heating system in accordance with the illustrated embodiment.

As schematically, shown in FIG. 2, the second heating system (engine coolant based heating system) has a blower 24 and a heater core 26, with ductwork 28 for directing the heated air to the vehicle cabin interior space 12. Basically, in vehicles with liquid-cooled engines, the engine heat (byproduct of the combustion process) contained in the coolant is used to warm the vehicle cabin interior space 12. The heater core 26 consists of tubes and fins, and has the same basic design as the engine radiator. Engine coolant from the internal combustion engine of the vehicle 10 flows through the tubes of the heater core 26, while air flows through the fins of the heater core 26. The blower 24 can be a constant-speed or adjustable-speed electric blower, which forces the air into the vehicle cabin interior space 12.

In the second heating system (engine coolant based heating system), the entire air flow is usually directed through the heater core 26 while a valve controls the heating output by regulating the flow of coolant through the heater core 26. However, alternately, the flow of coolant through the heater core 26 is unrestricted, and the heat is regulated by dividing the air flow before it reaches the heater core 26. In other words, in this alternative configuration, a portion of the air flows through the heater core 26, while the rest is directed around the heater core 26. The two currents are subsequently reunited in the plenum chamber. An air flap can be used to regulate the distribution of the two currents, thereby determining the amount of heat taken from the coolant. Preferably, at least one air temperature sensor 29 is provided in the ductwork 28 at a location downstream of the air flow through the heater core 26. Since the second heating system (engine coolant based heating system) can be a conventional heating system that is commonly used in most vehicles, the second heating system (engine coolant based heating system) will not be discussed and/or illustrated in further detail herein.

The first and second heating systems are controlled by an HVAC controller 30 that includes a user interface device 32. The controller 30 preferably includes a microcomputer with an HVAC control program that controls first and second heating systems as discussed below, to heat the vehicle cabin interior space 12. Preferably, the controller 30 sets a target surface temperature or temperatures, depending on the heating mode, and controls the lower and upper infrared heaters 20 and 22 towards the target surface temperature(s) based on an effective or estimated surface temperature directly in front of the upper infrared heater(s) in the vehicle cabin interior space 12, as discussed below. On the other hand, the controller 30 sets a target air temperature or temperatures, depending on the heating mode, and controls the heater core 26 or the air flowing through the heater core based on the target air temperature(s) detected by the air temperature sensor 29.

The HVAC controller 30 can also include other conventional components such as an input interface circuit, an output interface circuit, and storage devices such as a ROM (Read Only Memory) device and a RAM (Random Access Memory) device. The microcomputer of the HVAC controller 30 is programmed to control at least the operations of the blower 24, the doors or flaps in the ductwork 28 and the infrared heaters 20 and 22. Basically, the HVAC controller 30 controls the blower 24, the doors or flaps in the ductwork 28 so as to automatically maintain an interior air temperature of the vehicle cabin interior space 12 to a user target air temperature. In other words, sensors monitor the temperatures of the vehicle's interior and of the air emerging from the ductwork 28. The HVAC controller 30 processes this information and compares it with the target air temperature. Meanwhile, a solenoid valve installed in the cooling circuit of the heater core 26 opens and closes at a given frequency in response to the signals which it receives from the HVAC controller 30 to regulate the heating of the air entering the vehicle cabin interior space 12. The adjustments in open/close ratio in the cycle periods regulate the flow rate from the closed position up to the maximum. A servo-actuated adjustment flap can be employed to provide infinitely-variable temperature regulation to allow for separate adjustment between the left and right sides of the vehicle cabin interior space 12.

The user interface device 32 is configured to allow a user to set a target cabin interior temperature for the vehicle cabin interior space 12 as well as other settings such as heating mode, blower speed, etc. for both the first and second heating systems. These setting are carried out by the HVAC controller 30, which is operatively coupled to the components of the first heating system (i.e., the infrared heaters 20 and 22) and to the components of the second heating system (i.e., internal combustion engine or electric motor coolant based heating system) to selectively operate the first and second heating systems to heat the vehicle cabin interior space 12.

In the case of the hybrid vehicle 10, the first and second heating systems are preferably controlled by the controller 30 to save electricity during an electric mode in which only the motor of the hybrid vehicle 10 is operated. Thus, as in the illustrated embodiment, the controller 30 stops the coolant based heating system upon determining an ignition "on" position exists and the electric mode exist in the hybrid vehicle 10, and then only selectively uses the infrared heaters 20 and/or 22 to heat the cabin interior temperature towards the target temperature as seen in the flow chart of FIG. 4. When the controller 30 determines an ignition "on" position exists and a hybrid mode exist in the hybrid vehicle 10, the controller 30 selectively uses both the infrared heaters 20 and/or 22 and the second heating system (i.e., internal combustion engine or electric motor coolant based heating system) to heat the vehicle cabin interior space 12 with the infrared heaters 20 and/or 22 being operated as seen in accordance with the process shown in the flow chart of FIG. 4 and the conventional second heating system being operated in accordance with conventional methods.

Preferably, the user interface device 32 allows the user to set to various heating modes. In other words, the user interface device 32 includes a mode input switch in which the user can select a floor heat mode (e.g., operation of only the lower infrared heaters 20), a defog or defrost mode (e.g., operation of only the upper infrared heaters 22), or a full heat mode (e.g., both the lower and upper infrared heaters 20 and 22). During each of these modes, the blower 24 can be either automatically or manually operated so that the blower 24 can be turned "on", set to a preferred blower speed and turned "off" as needed and/or desired. For example, in the case of the defog or defrost mode, the blower 24 can be automatically turned "on" and set to a preset speed when the defog or defrost mode is selected. In this automatic defog or defrost mode, the user interface device 32 can be set to a plurality of defog or defrost settings with the target surface temperature of the upper infrared heaters 22 and/blower speed changing with each setting. Alternatively, in the case of the defog or defrost mode, the blower 24 can be manually operated and set to one of a plurality of preset speeds when the defog or defrost mode is selected.

Basically, the vehicle cabin heating system uses the first heating system (i.e., the infrared heaters 20 and 22) when the heat provided from the conventional second heating system (i.e., the coolant based heating system) is not sufficient to heat the vehicle at start-up or due to an internal combustion engine that generates less heat and therefore lower coolant temperatures, which heat the heater core. Moreover, in the vehicle cabin heating system, the controller 30 is operatively coupled to the lower and upper infrared heaters 20 and 22 to selectively operate the lower and upper infrared heaters 20 and 22 at prescribed conditions, especially when the temperature directly in front of the lower infrared heaters 20 below a prescribed temperature range as described below. The heating operation of the conventional second heating system (i.e., the coolant based heating system) is essentially independent of the heating operation of the first heating system (i.e., the infrared heaters 20 and 22). In particular, as explained below, the operation time of the infrared heaters 20 and 22 is controlled by achievement of a target surface temperature rather than cabin interior air temperature. In an extreme case, if the infrared heaters 20 and 22 are very powerful, only short bursts of on-time would be required in most conditions (regardless of the operation of the conventional second heating system). The conventional second heating system would be expected to be operating while a vehicle is in motion (heat being generated; pumps moving cooling fluids for EV and HEV as well as IC engines). When the vehicle is stopped, the engine or electric motor heat generation and fluid pump operation is to be minimized. To help accomplish that objective, the infrared heaters 20 and/or 22 can eventually "turn on" based on the surface temperature decrease due to the absence of the conventional system operation. In that way, the thermal conditions will control the operation of the infrared heaters 20 and 22 when the conventional second heating system is minimized. The surface temperature based operation of the infrared heaters 20 and 22, while the vehicle is in motion, will reduce the need to consume power with the conventional second heating system. This means energy savings in achieving and maintaining the temperature objectives. Further, the faster delivery of heat to the surfaces is considered a benefit with the infrared heaters 20 and 22 compared to waiting for the conventional second heating system to heat up.

As seen in FIGS. 1 and 2, the lower infrared heaters 20 are integrated into the vehicle cabin and aimed at the occupants' legs to give then a warmth sensation with reduced lamp power consumption. The upper infrared heaters 24 are integrated into the vehicle cabin and aimed at the windshield 16 to reduce moisture accumulation (e.g., defog the windshield 16). For these reasons, the lower infrared heaters 20 are disposed in the foot-wells and the upper infrared heaters 24 are disposed in A-pillars 18. The lower and upper infrared heaters 20 and 22 can be any of a variety of different types and styles with infrared elements that produces only infrared waves. Although some infrared elements are designed to produce a certain type of visible light wave or other types of waves for specific purposes (for example, to indicate when the element is being powered), most infrared elements for use in the infrared heating system produce substantially solely infrared waves. Assorted infrared heaters are commercially available. However, infrared heat lamps in the non-visible range, particularly carbon, are especially suitable for the lower and upper infrared heaters 20 and 22. Preferably, the lower and upper infrared heaters 20 and 22 emit either IR-B waves, or IR-C waves. The IR-B wavelength range is preferably 2000 to 3500 nm. While the IR-C wavelength range is preferably greater than 3500 nm. The lower and upper infrared heaters 20 and 22 can be operated with about 500 W of input power.

Long Wave (IR-C waves with wavelengths longer than 2000 nm) would also be effective for heat integration and not being noticeable to the vehicle occupants. For this reason, the lower infrared heaters 20 are preferably IR-C type infrared elements. On the other hand, IR-C waves are not absorbed by the water molecule. Thus, window defogging performance may suffer somewhat if IR-C type infrared elements are selected for the upper infrared heaters 22 over IR-B type infrared elements. For this reason, the upper infrared heaters 22 are preferably IR-B type infrared elements.

As mentioned above and shown in FIGS. 1 and 2, the lower infrared heaters 20 are arranged in the dashboard 14 so that the lower infrared heaters 20 are aimed into the foot-wells to supply heat to the foot-wells of the vehicle cabin interior space 12. As shown in FIGS. 1 and 2, the infrared heaters 20 are located above the foot-wells. Each of the lower infrared heaters 20 has a temperature sensor 34 that is mounted to a grill or lens of the dashboard 14 in front of the lower infrared heater 20. The temperature sensor 34 shown in FIG. 2 is located adjacent to the depicted lower infrared heater 20 and is spaced apart from the infrared heater 20 by only a small distance. Thus, the sensors 34 are in close proximity to their respective infrared heaters 20. The sensors 34 are also used to limit the temperature of the grill or lens surface (a target surface) that is heated and that the passenger(s) may contact. As shown in FIG. 2, the depicted sensor 34 is disposed between the infrared heater 20 and the front seat, and also between the infrared eater 20 and the foot-well. The sensor's temperature (after mathematical adjustment based on heat transfer properties) is used to control the temperature of a target surface within the cabin (passenger feet, windshield, etc.). Alternatively, only one the temperature sensor is used with the lower infrared heaters 20. If one of the temperature sensor 34 for each of the lower infrared heaters 20, then the first heating system can independently adjust the heat output to driver's side of the vehicle cabin with respect to the passenger's side of the vehicle cabin. In this way, the user interface device 32 can independently set target surface temperatures for the driver's side of the vehicle cabin and the passenger's side of the vehicle cabin. In the illustrated embodiment, a passenger presence sensor 38 is provided in the passenger's seat to determine whether a passenger is present in a front passenger seat of the vehicle cabin interior space 12. Using this passenger presence sensor 38, the controller 30 can automatically perform a stopping operation of the lower infrared heater 20 that is located on the passenger's side of the vehicle cabin based on a detection result of the passenger presence sensor 38 indicating that the front passenger seat of the vehicle cabin interior space 12 is empty. This passenger presence sensor 38 can be the same one that is used for "enabling" or "disabling" the passenger's air bag(s) function.

As mentioned above, the upper infrared heaters 22 are arranged in the A-pillars 18 adjacent the windshield 16 to apply heat across an interior surface of the windshield 16 and to supply heat to an upper area of the vehicle cabin interior space 12. Each of the upper infrared heaters 22 has a temperature sensor 36 that is mounted to a grill or lens in front of the upper infrared heaters 22. Alternatively, only one the temperature sensor is used with the upper infrared heaters 22, or no temperature sensors are used with the upper infrared heaters 22. If no temperature sensors are used with the upper infrared heaters 22, then the temperature sensor 34 of the lower infrared heaters 20 can be used to control the operation of the upper infrared heaters 22.

Figure 4:
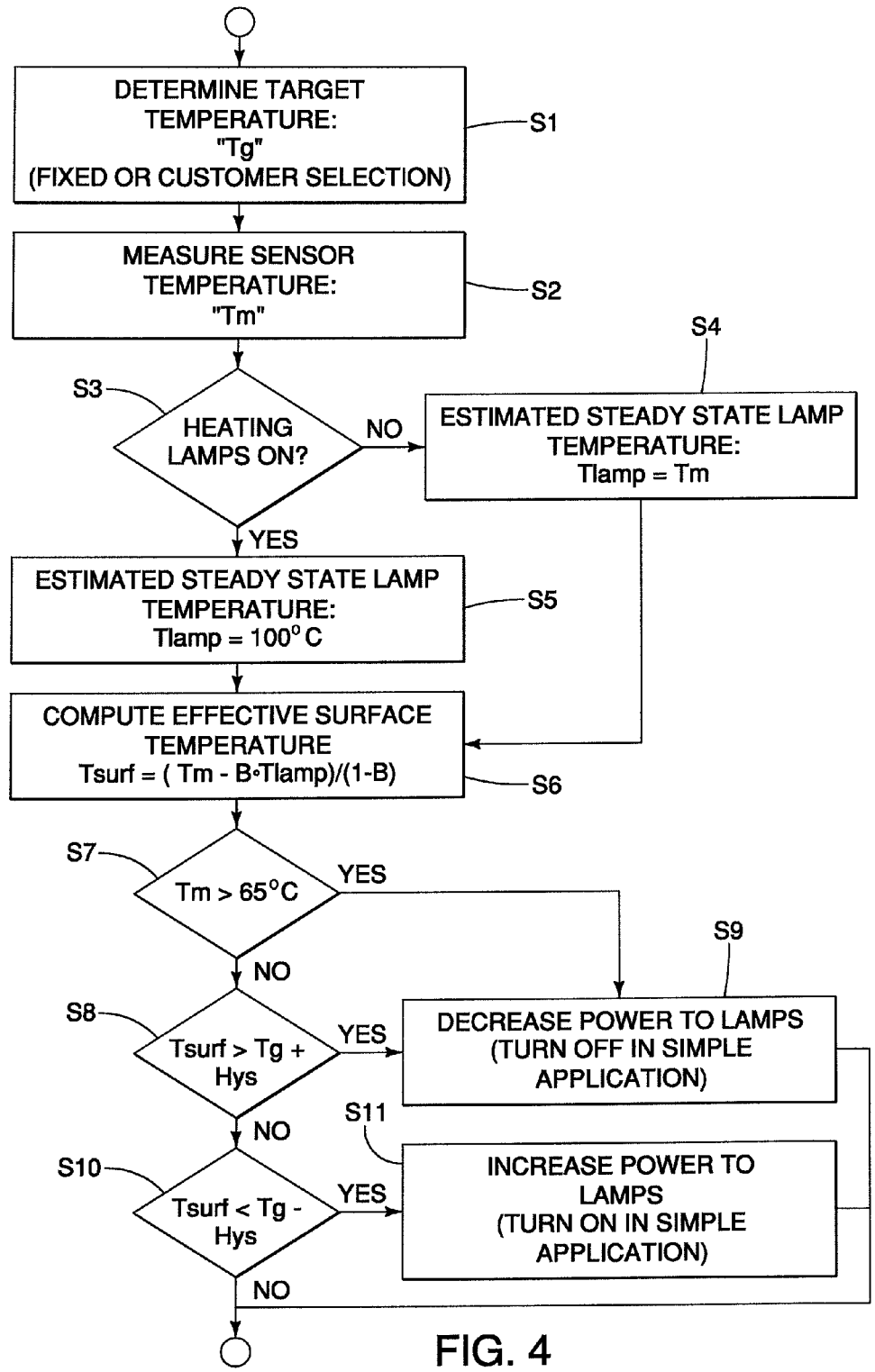
FIG. 4 is a flow chart showing an example of steps executed by the controller of the vehicle cabin heating system to heat the vehicle cabin interior space.

Referring now to FIG. 4, a flow chart is illustrated that shows an example of operations executed by the controller 30 of the vehicle cabin heating system to heat the vehicle cabin interior space 12 using the lower infrared heaters 20 and/or the upper infrared heaters 22. The operations of the flow chart are initiated after the vehicle is started (ignition "on") and the user turns on the vehicle cabin heating system. The process of the flow chart of FIG. 4 will be executed at prescribed intervals once the user interface is set to a heating application (e.g., a floor heat mode, a defog mode, defrost mode, or a full heat mode activating both the lower and upper infrared heaters 20 and 22).

In step S1, the controller 30 determines a target surface temperature Tg, which can be either preset in advance or set by the user. For example, the target surface temperature Tg can be set between 35° C. to 40° C. at the location of the passenger's foot. If the user selects only to operate the lower infrared heaters 20, then the then the target surface temperature Tg is set for the lower infrared heaters 20 only. On the other hand, if the user selects a defrost or defog mode, then the target surface temperature Tg is set for the upper infrared heaters 22 only. Of course, the user selects to operate both the lower and upper infrared heaters 20 and 22, then a first target surface temperature Tg is set for the lower infrared heaters 20 and a second target surface temperature Tg is set for the upper infrared heaters 22 in which the first and second target surface temperatures Tg can be the same or different. Also, the user can set a different target surface temperature Tg for the driver's lower infrared heater 20 then for the passenger's lower infrared heater 20, if desired.

For the sake of simplicity, the remaining steps in the flow chart of FIG. 4 will considered a case in which the lower infrared heaters 20 will be operated together using a single temperature sensor. However, the process of the flow chart of FIG. 4 can be executed by the controller 30 such that all of the lower and upper infrared heaters 20 and 22 operate by a single temperature sensor, or operated individually, or operated based on location (e.g., the lower infrared heaters operated together and the upper infrared heaters operated together).

In step S2, the controller 30 receives a signal from the temperature sensor 34 to determine a measured temperature Tm, which is indicative of actual temperatures in front of one of the lower infrared heaters 20, and then proceeds to step S3.

In step S3, the controller 30 determines if the lower infrared heaters 20 are currently "on'". If the controller 30 determines that the lower infrared heaters 20 are currently "on", then the controller 30 proceeds to step S4. However, if in step S3, the controller 30 determines that the lower infrared heaters 20 are currently "off", then the controller 30 proceeds to step S4.

In step S5, the controller 30 sets the estimated steady state lamp temperature Tlamp to the measured temperatures Tm, and then proceeds to step S6.

In step S5, the controller 30 sets an estimated steady state lamp temperature Tlamp to a preset value such as 100°, and then proceeds to step S6.

In step S6, the controller 30 computes an effective or estimated surface temperature Tsurf in an area near or on the passenger's feet. Thus, the controller 30 controls this effective surface temperature Tsurf temperature, which is a temperature at a relatively great distance from the lower infrared heaters 20 as compared to the sensor location of the temperature sensor 34. For example, the controller 30 can compute the effective surface temperature Tsurf using the following equation:

$$T\text{surf} = (Tm - B \cdot T\text{lamp})/(1-B)$$

where B is a calibration factor (e.g., B=0.05)

In step S7, the controller 30 determines if the measured temperature Tm detected by the temperature sensor 34 is greater than a prescribed temperature limit such as 65° C. Thus, by this step, since the temperature sensor 34 is provided in the grill or lens of the lower infrared heater 20, the controller 30 can control the temperature of that specific surface, which the passengers may contact, based on the measured temperature Tm. In other words, the controller 30 uses the sensor's temperature to avoid a surface from becoming too hot to touch (e.g., 65° C.). If the controller 30 determines the measured temperature Tm detected by the temperature sensor 34 is greater than the prescribed temperature limit e.g., 65° C., in step S7, the process proceeds to step S9. On the other hand, if the controller 30 determines the measured temperature Tm detected by the temperature sensor 34 is less than or equal to the prescribed temperature limit e.g., 65° C., in step S7, the process proceeds to step S8.

In step S8, the controller 30 determines if the effective surface temperature Tsurf is greater than the target surface temperature Tg plus a prescribed hysteresis value Hys such as 3° C. If the controller 30 determines, in step S8, that the effective surface temperature Tsurf is greater than the target surface temperature Tg plus the prescribed hysteresis value Hys, then the controller 30 proceeds to step S9, where either the power to the lower infrared heaters 20 is decreased or the lower infrared heaters 20 are simply turned "off". However, if in step S8, the controller 30 determines that the effective surface temperature Tsurf is less than or equal to the target surface temperature Tg plus the prescribed hysteresis value Hys, then the controller 30 proceeds to step S10.

In step S10, the controller 30 determines if the effective surface temperature Tsurf is less than the target surface temperature Tg minus the prescribed hysteresis value Hys. If the controller 30 determines, in step S8, that the effective surface temperature Tsurf is less than the target surface temperature Tg minus the prescribed hysteresis value Hys, then the controller 30 proceeds to step S11, where either the power to the lower infrared heaters 20 is increased or the lower infrared heaters 20 are simply turned "on". However, if in step S10, the controller 30 determines that the effective surface temperature Tsurf is greater than or equal to the target surface temperature Tg minus the prescribed hysteresis value Hys, then the process ends.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle cabin heating system.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle cabin heating system comprising:
    a first infrared heater aimed to heat a target surface in front of the first infrared heater within a vehicle cabin interior space;
    a temperature sensor disposed in front of the first infrared heater, the temperature sensor being spaced apart from the target surface and being positioned closer to the first infrared heater than to the target surface; and
    a controller operatively coupled to the temperature sensor and the first infrared heater to selectively operate the first infrared heater to a target surface temperature within the vehicle cabin interior space whenever an estimated surface temperature of the target surface is determined based on the measured temperature by the temperature sensor falls below a prescribed temperature range below the target surface temperature.

2. The vehicle cabin heating system according to claim 1, wherein
    the first infrared heater is arranged in a foot-well of the vehicle cabin interior space.

3. The vehicle cabin heating system according to claim 2, further comprising
    a second infrared heater arranged in a passenger side foot-well of the vehicle cabin interior space and operatively coupled to the controller, the first infrared heater being arranged in a driver side foot-well of the vehicle cabin interior space.

4. The vehicle cabin heating system according to claim 3, further comprising
    a passenger presence sensor to determine whether a passenger is present in a front passenger seat of the vehicle cabin interior space, and the controller stopping operation of the second infrared heater based on a detection result of the passenger presence sensor indicating that the front passenger seat of the vehicle cabin interior space is empty.

5. The vehicle cabin heating system according to claim 1, wherein
    the first infrared heater is aimed at a windshield of the vehicle cabin interior space to apply heat across an interior surface of the windshield.

6. The vehicle cabin heating system according to claim 5, further comprising
    a second infrared heater aimed at the windshield to apply heat across an interior surface of the windshield.

7. The vehicle cabin heating system according to claim 2, further comprising
    a second infrared heater aimed at the windshield to apply heat across an interior surface of the windshield.

8. The vehicle cabin heating system according to claim 3, wherein
    the first and second infrared heaters are independently operable.

9. The vehicle cabin heating system according to claim 1, wherein
    the controller is operatively coupled to a user interface device for a user to set the target surface temperature.

10. The vehicle cabin heating system according to claim 1, wherein
    the first infrared heater emits either IR-B waves with a wavelength range of 2000 to 3500 nm, or IR-C waves with wavelengths greater than 3500 nm.

11. The vehicle cabin heating system according to claim 1, wherein
    the electrical infrared heater is a carbon infrared heat lamp.

12. The vehicle cabin heating system according to claim 1, wherein
    the controller determines if the measured temperature detected by the temperature sensor is greater than a prescribed temperature limit, and lowers a heat output of the infrared heater when the measured temperature detected by the temperature sensor is greater the prescribed temperature limit.

13. The vehicle cabin heating system according to claim 1, wherein
    the controller stops a coolant based heating system upon determining an ignition "on" position exists and an electric mode exist in a hybrid vehicle in which the vehicle cabin heating system is installed, the controller then only selectively uses the first infrared heater to heat vehicle cabin interior space.

14. The vehicle cabin heating system according to claim 1, wherein
    the controller operates a coolant based heating system upon determining an ignition "on" position exists and a hybrid mode exist in a hybrid vehicle in which the vehicle cabin heating system is installed, and selectively uses both the first infrared heater and the coolant based heating system to heat the vehicle cabin interior space.

15. The vehicle cabin heating system according to claim 2, wherein
    the temperature sensor is mounted to a dashboard surface.

16. A vehicle cabin heating system comprising:
    a first infrared heater aimed to heat a target surface in front of the first infrared heater within a vehicle cabin interior space;
    a temperature sensor disposed between the first infrared heater and the target surface, with the temperature sensor being spaced apart from the target surface; and
    a controller operatively coupled to the temperature sensor and the first infrared heater to selectively operate the first infrared heater to a target surface temperature within the vehicle cabin interior space whenever an estimated surface temperature of the target surface is determined based on the measured temperature by the temperature sensor falls below a prescribed temperature range below the target surface temperature.

17. The vehicle cabin heating system according to claim 15, wherein
the first infrared heater is arranged in a foot-well of the vehicle cabin interior space.

18. The vehicle cabin heating system according to claim 17, further comprising
a second infrared heater arranged in a passenger side foot-well of the vehicle cabin interior space and operatively coupled to the controller, the first infrared heater being arranged in a driver side foot-well of the vehicle cabin interior space.

19. The vehicle cabin heating system according to claim 18, further comprising
a passenger presence sensor to determine whether a passenger is present in a front passenger seat of the vehicle cabin interior space, and the controller stopping operation of the second infrared heater based on a detection result of the passenger presence sensor indicating that the front passenger seat of the vehicle cabin interior space is empty.

20. The vehicle cabin heating system according to claim 15, wherein
the first infrared heater is aimed at a windshield of the vehicle cabin interior space to apply heat across an interior surface of the windshield.

21. The vehicle cabin heating system according to claim 16, further comprising
a second infrared heater aimed at the windshield to apply heat across an interior surface of the windshield.

22. The vehicle cabin heating system according to claim 15, wherein
the temperature sensor is mounted to a dashboard surface.

23. The vehicle cabin heating system according to claim 15, wherein
the first infrared heater is located within a dashboard assembly within the vehicle cabin interior space.

24. A vehicle cabin heating system comprising:
a first infrared heater arranged within a dashboard assembly within a vehicle cabin interior space, the first infrared heater being aimed to heat a target surface in front of the first infrared heater, the target surface being a front seat within a vehicle cabin interior space;
a temperature sensor mounted to a surface of the dashboard assembly between the front seat and the first infrared heater; and
a controller operatively coupled to the temperature sensor and the first infrared heater to selectively operate the first infrared heater to a target surface temperature within the vehicle cabin interior space whenever an estimated surface temperature of the target surface is determined based on the measured temperature by the temperature sensor falls below a prescribed temperature range below the target surface temperature.

25. The vehicle cabin heating system according to claim 24, further comprising
a second infrared heater arranged in a passenger side of the vehicle cabin interior space and operatively coupled to the controller, the first infrared heater being arranged in a driver side of the vehicle cabin interior space.

26. The vehicle cabin heating system according to claim 25, further comprising
a passenger presence sensor to determine whether a passenger is present in a front passenger seat of the vehicle cabin interior space, and the controller stopping operation of the second infrared heater based on a detection result of the passenger presence sensor indicating that the front passenger seat of the vehicle cabin interior space is empty.

27. The vehicle cabin heating system according to claim 26, wherein
the first and second infrared heaters are independently operable.

28. The vehicle cabin heating system according to claim 24, further comprising
a second infrared heater aimed at the windshield to apply heat across an interior surface of the windshield.

29. The vehicle cabin heating system according to claim 28, wherein
the first and second infrared heaters are independently operable.

30. A vehicle cabin heating system comprising:
a first infrared heater aimed to heat a target surface in front of the first infrared heater, the target surface being located within a foot-well within a vehicle cabin interior space;
a temperature sensor disposed in front of the first infrared heater between the first infrared heater and the foot-well, the temperature sensor being spaced apart the target surface; and
a controller operatively coupled to the temperature sensor and the first infrared heater to selectively operate the first infrared heater to a target surface temperature within the vehicle cabin interior space whenever an estimated surface temperature of the target surface is determined based on the measured temperature by the temperature sensor falls below a prescribed temperature range below the target surface temperature.

31. The vehicle cabin heating system according to claim 30, wherein
the temperature sensor is mounted to a dashboard surface.

32. The vehicle cabin heating system according to claim 30, further comprising
a second infrared heater arranged in a passenger side of the vehicle cabin interior space and operatively coupled to the controller, the first infrared heater being arranged in a driver side of the vehicle cabin interior space.

33. The vehicle cabin heating system according to claim 32, further comprising
a passenger presence sensor to determine whether a passenger is present in a front passenger seat of the vehicle cabin interior space, and the controller stopping operation of the second infrared heater based on a detection result of the passenger presence sensor indicating that the front passenger seat of the vehicle cabin interior space is empty.

34. The vehicle cabin heating system according to claim 33, wherein
the first and second infrared heaters are independently operable.

35. The vehicle cabin heating system according to claim 30, further comprising
a second infrared heater aimed at the windshield to apply heat across an interior surface of the windshield.

36. The vehicle cabin heating system according to claim 35, wherein
the first and second infrared heaters are independently operable.

* * * * *